US012810369B2

(12) United States Patent
Beverly

(10) Patent No.: US 12,810,369 B2
(45) Date of Patent: Nov. 24, 2026

(54) SYSTEM AND METHOD OF FACILITATING THE OFFLINE DIGITAL NOTARIZATION OF DOCUMENTS

(71) Applicant: Joanne Evelyn Beverly, Prescott, AZ (US)

(72) Inventor: Joanne Evelyn Beverly, Prescott, AZ (US)

(73) Assignee: The Beverly Enterprises 2017 Revocable Living Trust, dated March 16, 2017, Prescott, AZ (US)

( * ) Notice: Subject to any disclaimer, the term of this patent is extended or adjusted under 35 U.S.C. 154(b) by 259 days.

(21) Appl. No.: 18/316,921

(22) Filed: May 12, 2023

(65) Prior Publication Data

US 2023/0368319 A1 Nov. 16, 2023

Related U.S. Application Data

(60) Provisional application No. 63/341,150, filed on May 12, 2022.

(51) Int. Cl.
*G06Q 50/18* (2012.01)
*G06F 21/32* (2013.01)

(52) U.S. Cl.
CPC ............. *G06Q 50/18* (2013.01); *G06F 21/32* (2013.01)

(58) Field of Classification Search
None
See application file for complete search history.

(56) References Cited

U.S. PATENT DOCUMENTS 8,412,949 B2 4/2013 Giobbi et al.
2007/0260888 A1* 11/2007 Giobbi .................... G06F 21/32 713/186
2010/0138904 A1* 6/2010 Anguiano Jimenez ...................... G06Q 50/18 709/219
2013/0325728 A1 12/2013 Bialostok et al.
2014/0139989 A1* 5/2014 Mori ..................... G06F 1/1632 361/679.09

(Continued)

OTHER PUBLICATIONS

Youtube, how to use Find My to locate lost Apple Devices like the iPhone, published 2021, available at: < https://youtu.be/o2Q2x6IBteo? t=138 >.*

(Continued)

*Primary Examiner* — Richard W. Crandall

(57) ABSTRACT

A system and a method of facilitating the offline digital notarization of documents within the exclusive control of a notary public to perform a notary act using a digital notary journal while following laws and regulations. A notary account enters background information using a notary personal computing (PC) device. The notary account then enters signing user identification (ID) information. Then, a signing user account enters a digital user signature. The signing user account also enters biometric user information. Then, the signing user information, the signing user ID information, the digital user signature, and the biometric user information are compiled into a new journal event log. Afterwards, the new journal event log is timestamped to create a permanent record of the notary act. Finally, the new journal event is appended into a digital journal where the new journal event can be accessed later using the notary PC device for bookkeeping purposes.

6 Claims, 13 Drawing Sheets

(56) References Cited

U.S. PATENT DOCUMENTS

| | | | | |
|---|---|---|---|---|
| 2015/0381624 | A1 | 12/2015 | Reiter et al. | |
| 2017/0230357 | A1 * | 8/2017 | Canfield | G06F 21/45 |
| 2020/0258176 | A1 * | 8/2020 | Gibson | G06F 21/32 |
| 2023/0188986 | A1 * | 6/2023 | Tortosa | H04L 9/3213 455/411 |

OTHER PUBLICATIONS

Notary Act, retrieved from the internet, retrieved on May 12, 2023, <URL: https://www.notaryact.com/>.

Electronic Notary Journals, retrieved from the internet, retrieved on May 12, 2023 <URL: https://www.docverify.com/Products/E-Signatures/E-Notaries/Electronic-Notary-Journals>.

* cited by examiner

SYSTEM AND METHOD OF FACILITATING THE OFFLINE DIGITAL NOTARIZATION OF DOCUMENTS

The current application claims a priority to the U.S. provisional patent application Ser. No. 63/341,150 filed on May 12, 2022.

FIELD OF THE INVENTION

The present invention relates generally to digital journals and notarization methods. More specifically, the present invention provides a novel and secure way to perform offline document notarization.

BACKGROUND OF THE INVENTION

A notary public is an official of integrity appointed by a state government. The notary public is saddled with the responsibility to serve the public as an impartial witness in performing a variety of official fraud-deterrent acts related to the signing of important documents, often referred to notarizations or notarial acts. Notaries are publicly commissioned as “ministerial” officials, meaning that notaries are expected to follow written rules without the exercise of significant personal discretion, as would otherwise be the case with a “judicial” official. The notary journal, also known as the notary logbook, is one the most important “tools” of the public notary. A notary journal is a record of acts performed by a notary public. If an act is called into question, a properly maintained notary journal assists in determining critical facts about the act in question. State laws vary, which gives rise to different types of notary journals with different features. There is not one notary journal that meets all state laws. Regardless of the state laws, there are some features that are peculiar to all notary journals. For example, information kept in the notary journal needs to be confidential, be of high integrity, be easily accessible, and be under the exclusive control of the notary public. Any form of notary journal must provide these features for the notary journal to be of any use. While most notary journals in existence are in book and paper form, there are currently no notary journals in an electronic form that meets the basic requirements needed for a notary journal.

An objective of the present invention is to provide a digital notary journal that meets all basic legal requirements of a notary journal to facilitate the notarization of documents. The present invention provides a portable digital notary journal that meets all basic legal requirements set by the local government. Another objective of the present invention is to provide a secure method for facilitating the offline digital notarization of documents with the digital notary journal. The present invention provides the digital notary journal with security methods that enable the safe and efficient recording of notary acts by the notary public. The method of the present invention also ensures that the notary act is performed according to the legal requirements set by the local government. Another objective of the present invention is to provide a method of facilitating exclusive control of a digital notary journal by a notary public. The present invention provides a digital notary journal that is designed as a standalone computing device that is not connected to external servers or systems. The standalone design of the present invention enables the exclusive control of the digital notary journal by a notary public. Additional features and benefits of the present invention are further discussed in the sections below.

SUMMARY OF THE INVENTION

The present invention provides a system and a method of facilitating the offline digital notarization of documents. The system of the present invention includes a portable device that serves as a digital notary journal where a notary public can perform various notary acts while meeting all legal requirements set by the local government. The digital notary journal includes several safety features that allow the present invention to meet all the legal requirements. The digital notary journal is designed as a standalone computing device that the notary public has exclusive control over. Further, the digital notary journal is designed to be used by the notary public separate from external systems to protect the stored data. To do so, the present invention can utilize a biometric scanner or a Personal Identification Number (PIN) to prevent unauthorized access to the digital notary journal. The biometric scanner can also be utilized to record the necessary biometric data to fulfill all the required information for the various notary acts. Further, a method of the present invention enables the notary public to securely perform a desired notary act using the digital notary journal while meeting all the legal requirements set by the state. The method of the present invention includes the steps of performing the notary act using the digital notary journal in offline mode to protect the information gathered for the notary act. Further, the method of the present invention includes the steps of storing all data corresponding to the notary act locally on the digital notary journal until the data can be securely transferred to a secure server via a physical storage device. This way, the notary public can perform various notary acts in a more efficient manner while meeting all the legal requirements set by the local government.

DETAIL DESCRIPTIONS OF THE INVENTION

Figure 1:
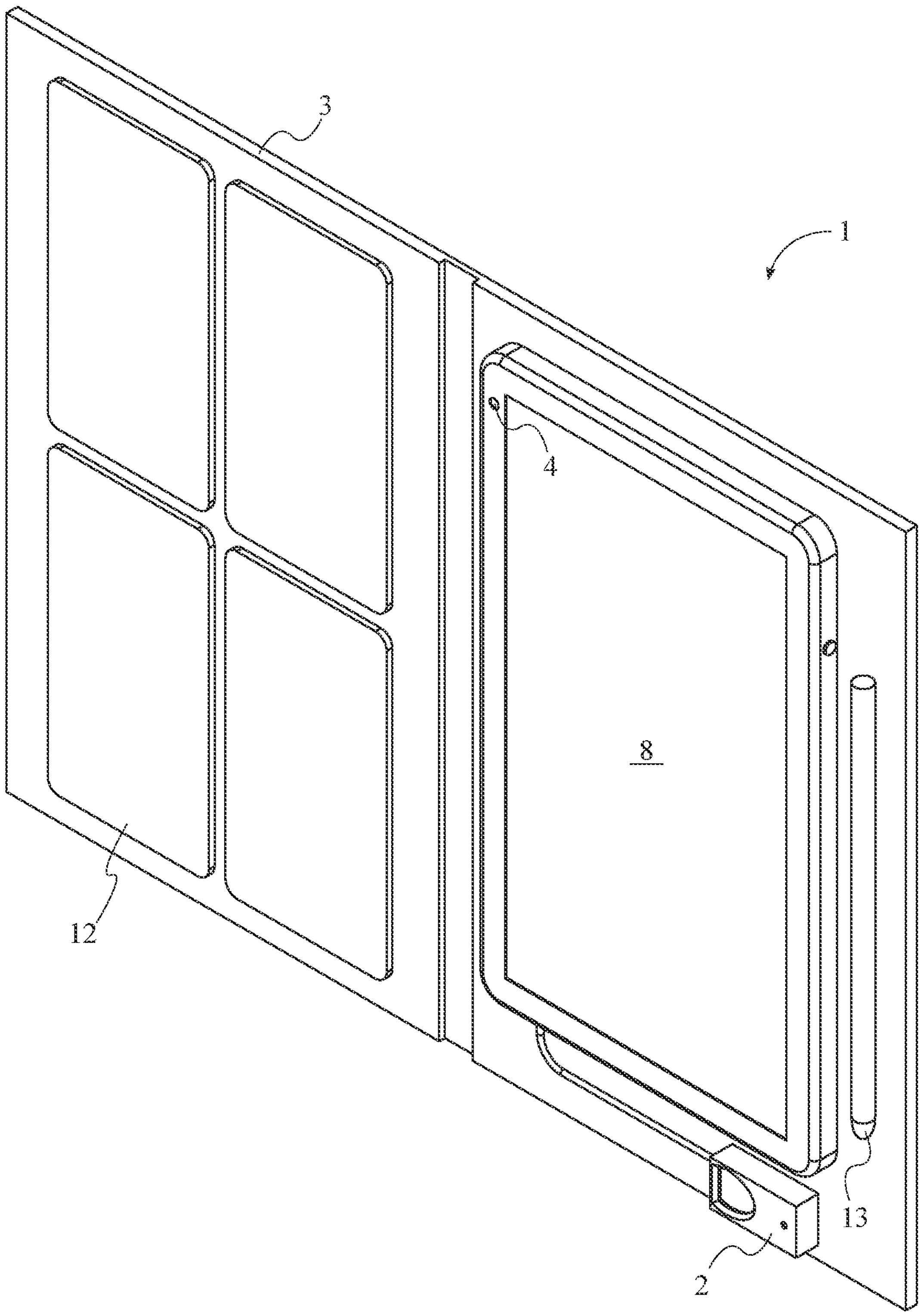
FIG. 1 is a top front perspective view of a notary Personal Computing (PC) device of the present invention.
Figure 2:
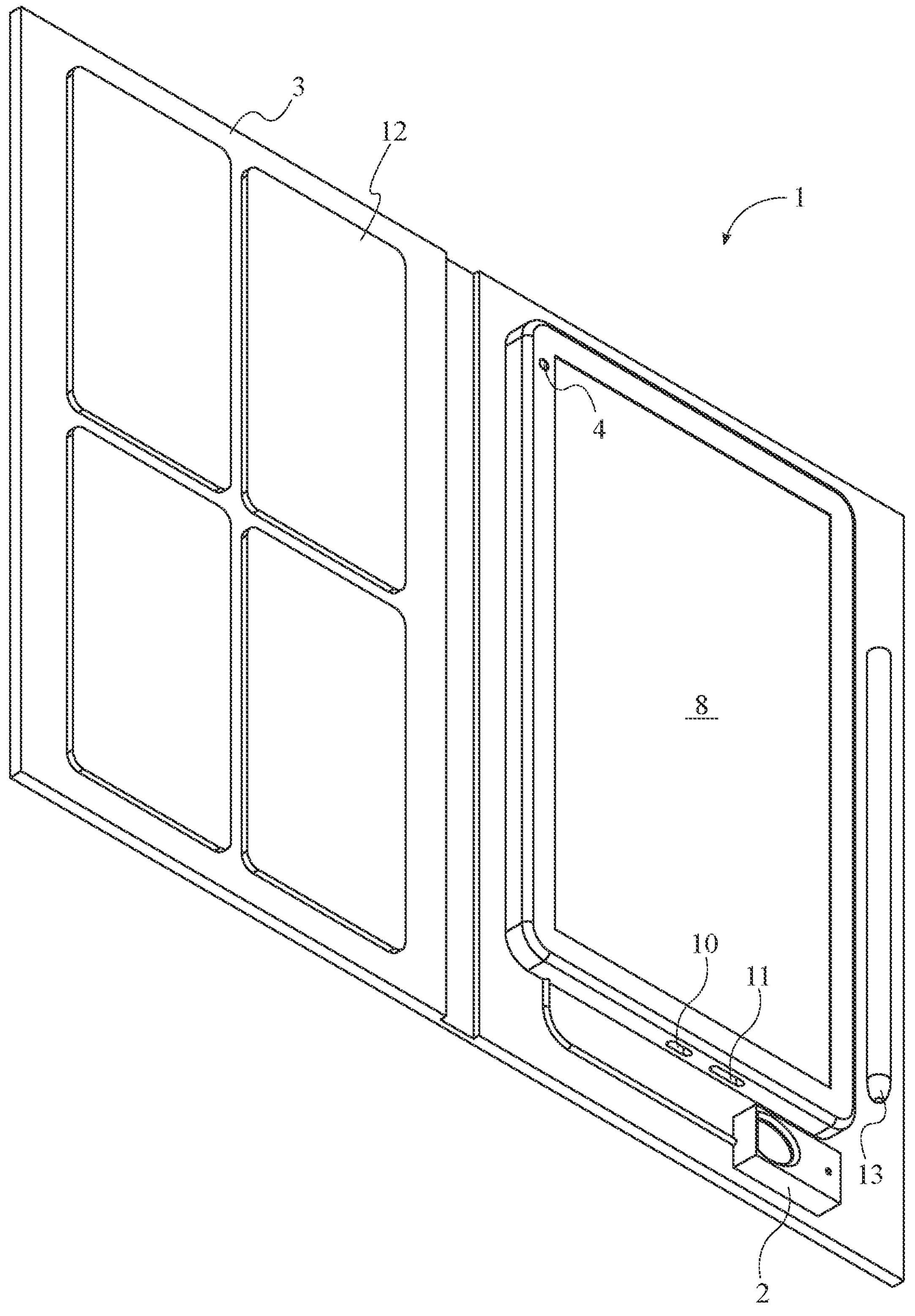
FIG. 2 is a bottom front perspective view of the notary PC device of the present invention.
Figure 3:
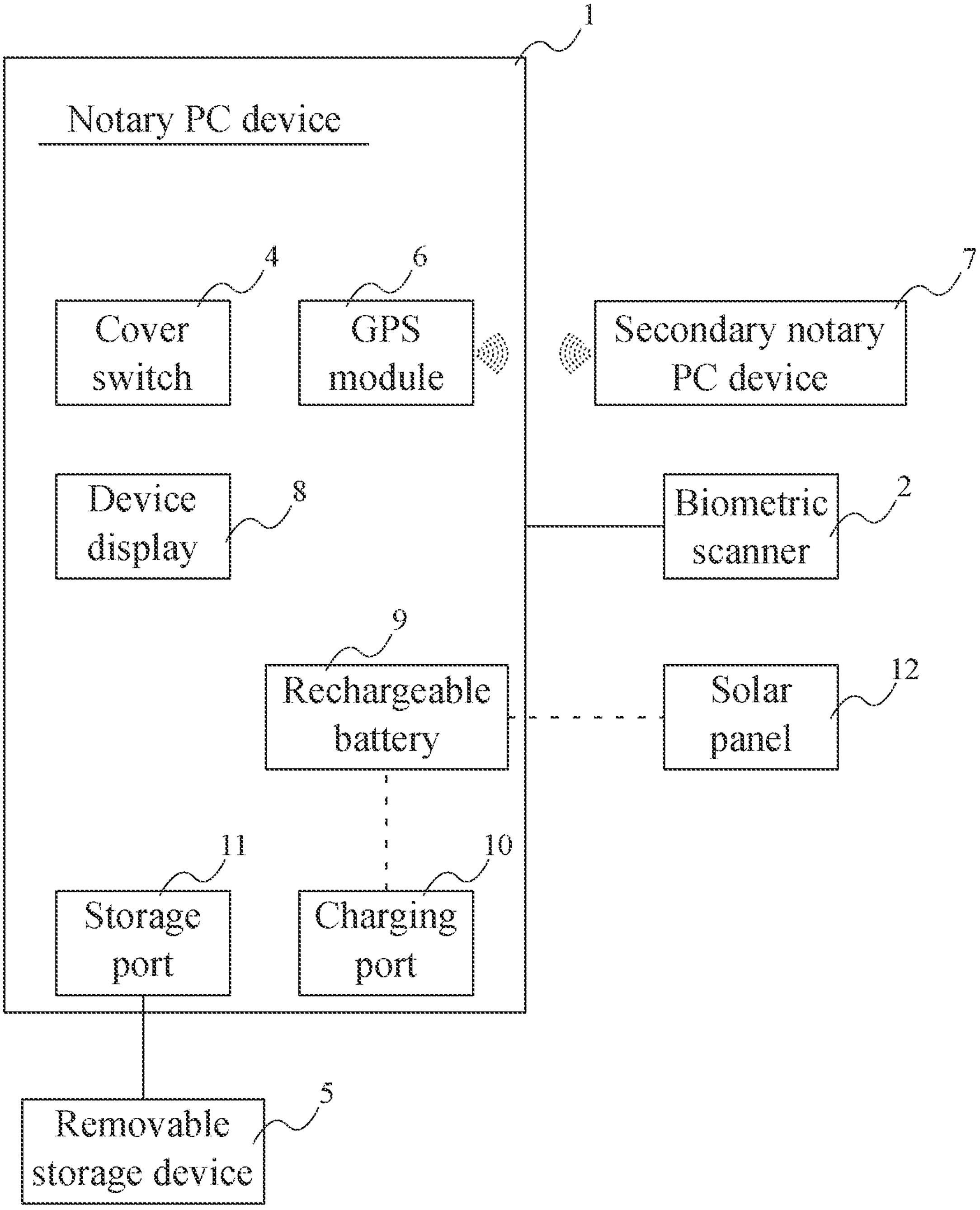
FIG. 3 is a schematic view of the present invention showing the electronic components and the electrical components of the notary PC device of the present invention.
Figure 4:
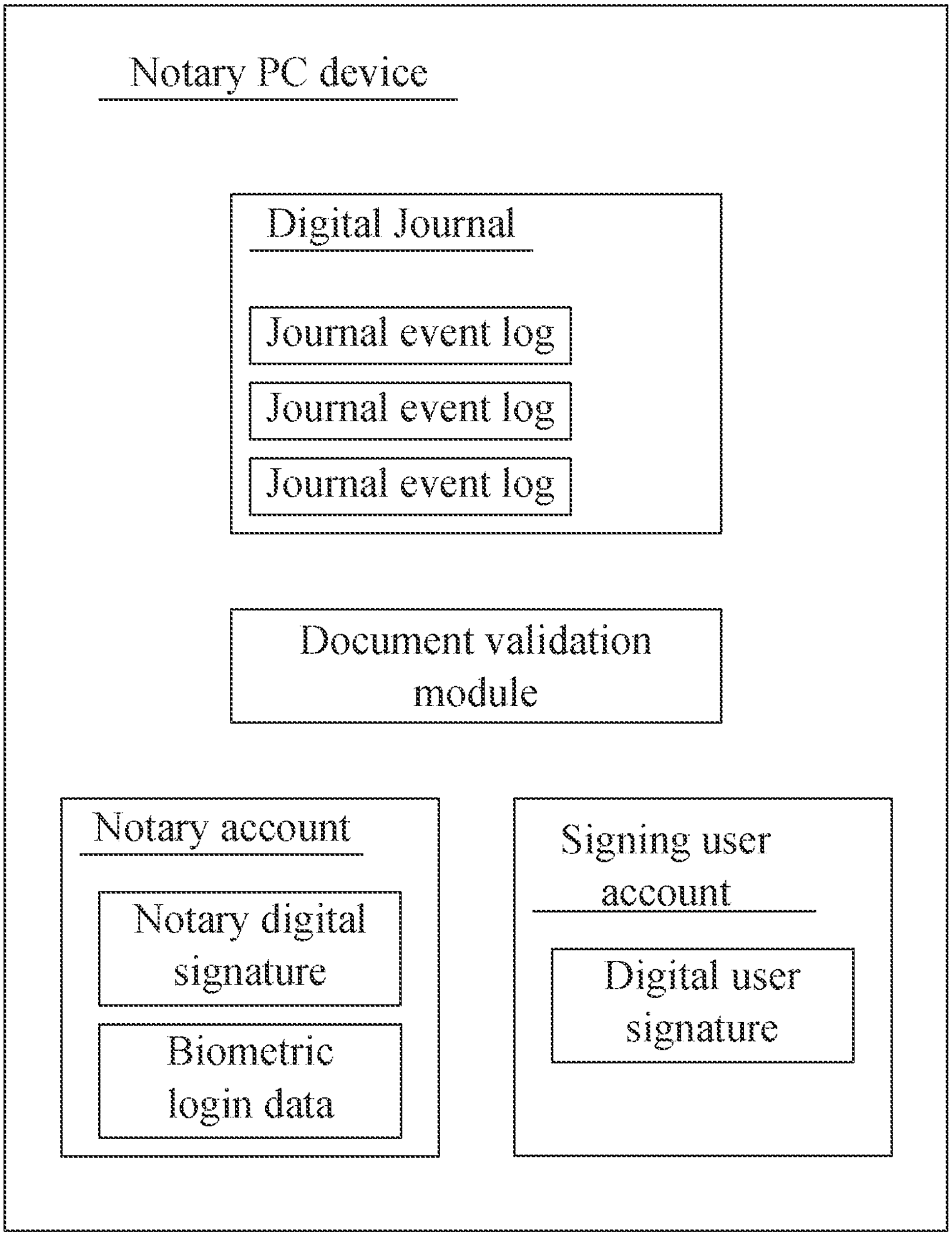
FIG. 4 is a diagram illustrating the overall system of the present invention.

All illustrations of the drawings are for the purpose of describing selected versions of the present invention and are not intended to limit the scope of the present invention.

The present invention provides a system and a method of facilitating the offline digital notarization of documents. The present invention provides an alternative to traditional paper notary journals that increases the efficiency of performing notary acts and storage of records while maintaining all legal requirements set by the local government. As can be seen in FIGS. 1 through 5, the system of the present invention includes at least one notary account (Step A). The notary account corresponds to the account used by the notary public to perform the digital notary acts. The notary account is associated with a corresponding notary personal computing (PC) device 1 where the notary public can perform the notary acts. The notary account gives the notary public exclusive access to the corresponding notary PC device 1 so that no unauthorized access is allowed. In addition, the corresponding notary PC device 1 includes a digital journal which serves as a digital version of a traditional notary journal that is locally stored on the corresponding notary PC device 1. The digital journal includes a plurality of journal event logs corresponding to permanent records of the notary acts performed by the notary public using the corresponding notary PC device 1. Further, the system of the present invention includes at least one signing user account managed by the corresponding notary PC device 1 (Step B). The signing user account corresponds to the account used by the individual involved in the notary act. Further, the signing user account is associated with a digital user signature that includes various user data that helps verify the identity of the user that signs the digital notary document to meet legal requirements.

In one embodiment, the corresponding notary PC device 1 is a portable computing device such as a tablet computer. The corresponding notary PC device 1 is preferably a standalone portable PC device that is not connected to an external system including, but not limited to, a remote server, third-party systems or services, etc. As can be seen in FIGS. 1 through 4, the corresponding notary PC device 1 includes a display 8 that is preferably a touch screen able to display data in various formats as well as to receive user input directly or using an input accessory 13, such as a stylus pen. The display 8 of the corresponding notary PC device 1 can provide on-screen input tools such as an on-screen keyboard to facilitate the input of data. However, in other embodiments, the corresponding notary PC device 1 can accommodate other input accessories such as a keyboard to further facilitate the input of data to complete the notary act. The display 8 of the corresponding notary PC device 1 can also utilize different display technologies to improve the efficiency of data input and output. For example, the display 8 of the corresponding notary PC device 1 can utilize electronic paper display technology that facilitates the reading of the display data as well as the input of the necessary data to complete the notary act. Furthermore, the corresponding notary PC device 1 is preferably an offline secure computing device to prevent unauthorized access to the stored internal data to meet the legal requirements of the local government. The corresponding notary PC device 1 only can be accessed by and operated by the notary public. In addition, the corresponding notary PC device 1 may include a rechargeable battery 9, a charging port 10, a power button, a storage port 11. The rechargeable battery 9 is integrated into the corresponding notary PC device 1. The charging port 10 is integrated into the corresponding notary PC device 1 to enable the recharging of the rechargeable battery 9. The power button is integrated into the corresponding notary PC device 1 to enable the select activation of the corresponding notary PC device 1. The storage port 11 enables the removable connection of external devices to the corresponding notary PC device 1 including, but not limited to, storage devices, peripherals, etc. In some embodiments, the system of the present invention may further include a solar panel 12 accessory that can be plugged into the charging port 10 to recharge the rechargeable battery 9 using renewable resources.

Figure 5:
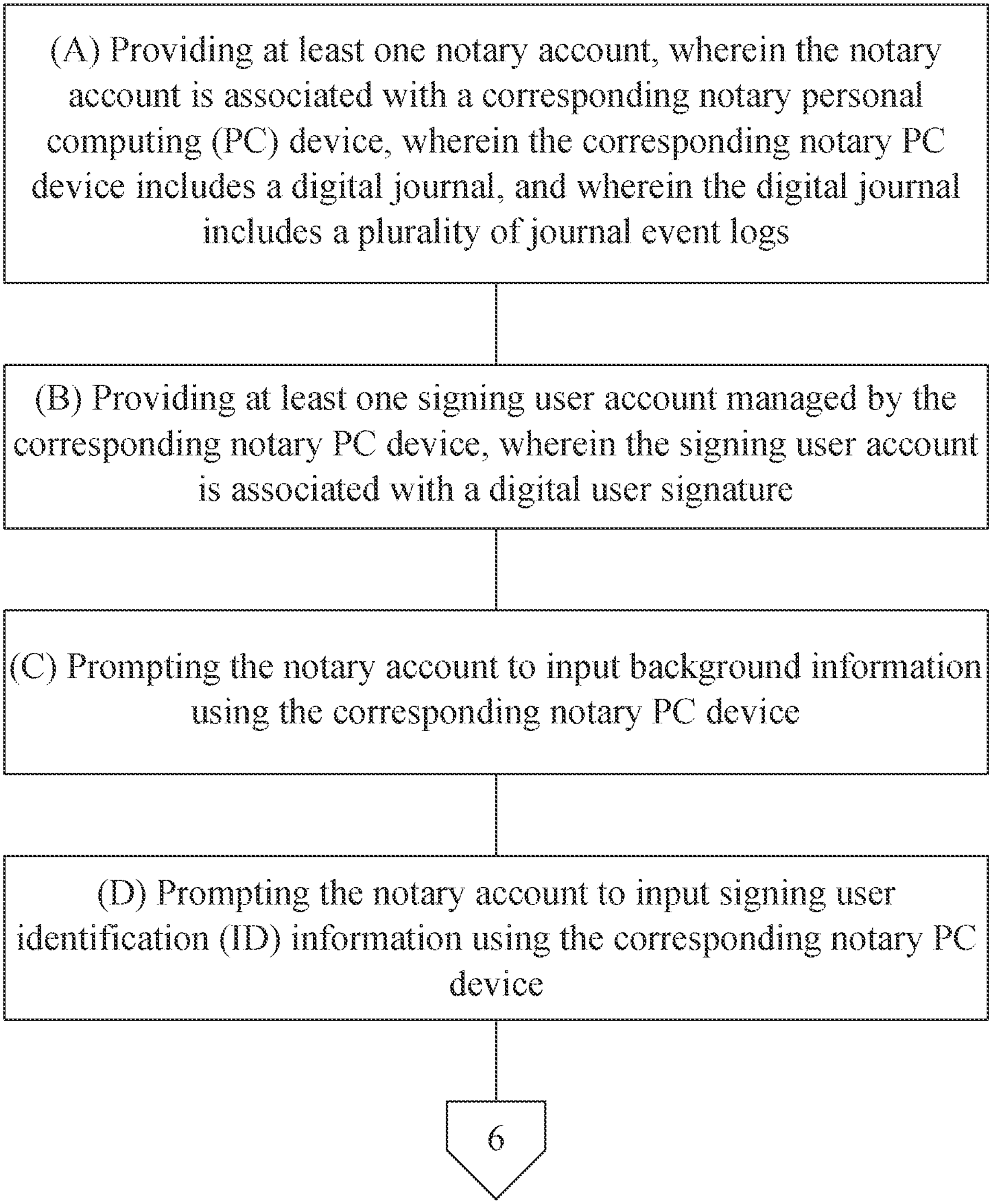
FIG. 5 is a flowchart illustrating the overall method of the present invention.
Figure 6:
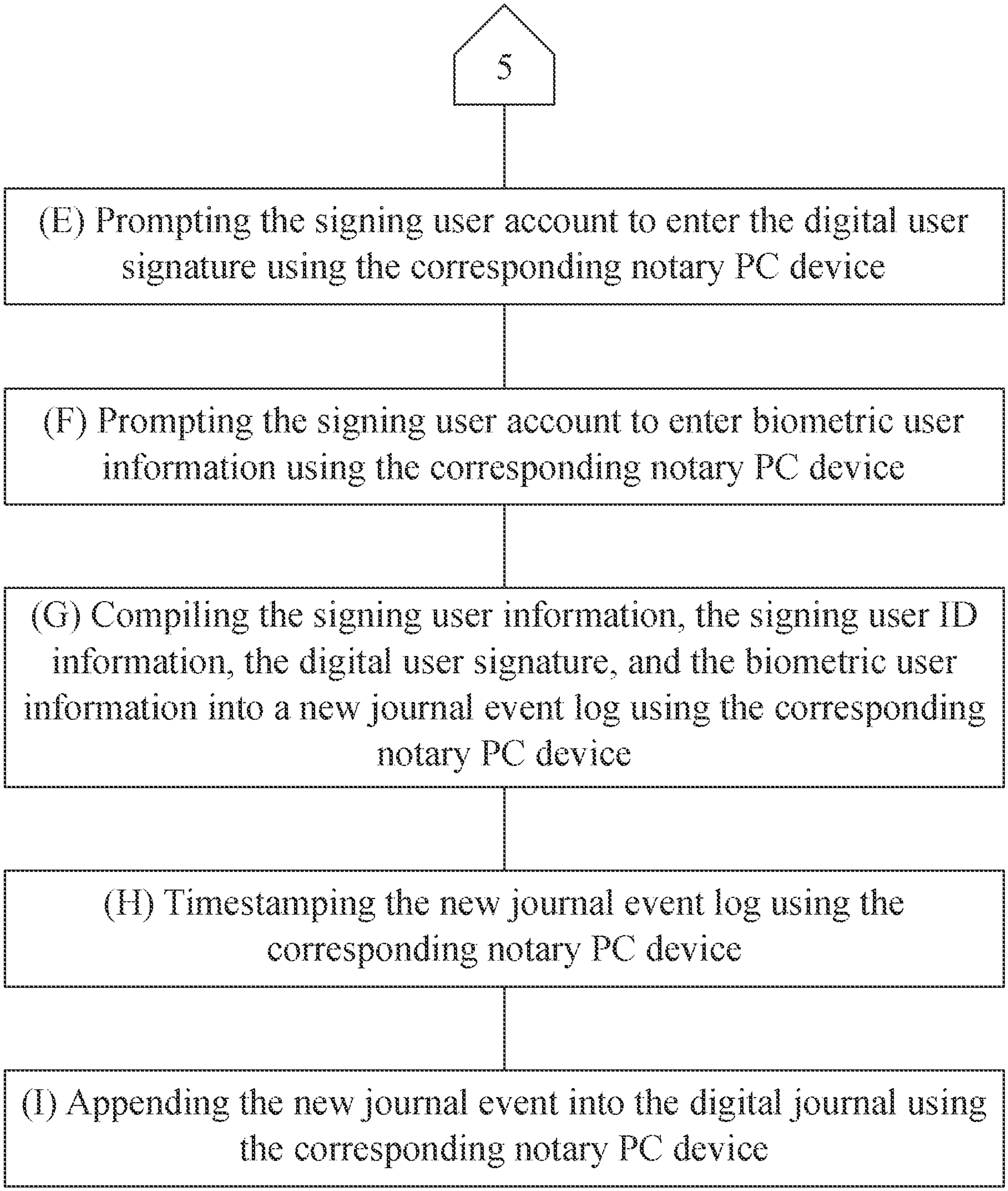
FIG. 6 is a flowchart illustrating the continuation of the overall method of the present invention.

The present invention allows for the efficient notarization of documents and other notary acts only by the notary public. As can be seen in FIGS. 5 and 6, an overall method of the present invention enables the notary public to perform the notary act using the corresponding notary PC device 1 so that the notary act can be efficiently performed while following laws and regulations. The overall method of the present invention begins by prompting the notary account to input background information using the corresponding notary PC device 1 (Step C). Only the notary public can initiate the corresponding notary PC device 1 to perform the desired notary act. The corresponding notary PC device 1 can include various functions which the notary public can select from. Further, each function enables the notary public to perform different notary acts including, but not limited to, journalizing an event, making copy requests, etc. Further, for each function, the corresponding notary PC device 1 can store different templates that meet different laws and regulations of a local government. According to the function/template selected, the corresponding notary PC device 1 displays the appropriate fields where the necessary background information can be entered by the notary public including, but not limited to, number of individuals signing the notarized document, date and time of the notary act, type of notary act, location of the notary act, type of document being notarized, additional information, notary fee, etc.

As can be seen in FIGS. 5 and 6, once all the background information is entered, the notary account is prompted to input signing user identification (ID) information using the corresponding notary PC device 1 (Step D). The signing user ID information can include information of the ID documentation provided to validate the identity of the person involved in the notary act as well as any involved credible witness information. The corresponding notary PC device 1 can provide various options of potential ID documentation that is acceptable for the notary act. For example, the corresponding notary PC device 1 can accept information of a valid driver's license and record the ID documentation to be stored along with the notarized documents. After the appropriate signing user ID information is recorded, the signing user account is prompted to enter the digital user signature using the corresponding notary PC device 1 (Step E). The corresponding notary PC device 1 can output various fields to record a digital signature that corresponds to the user signing the notarized document. For example, the signing user can input a signature using the display 8 of the corresponding notary PC device 1 directly or with a stylus pen.

As can be seen in FIGS. 5 and 6, after the digital user signature is entered by the signing user, the signing user account is also prompted to enter biometric user information using the corresponding notary PC device 1 (Step F). The biometric user information can include, but is not limited to, biometric data of the signing user captured using the corresponding notary PC device 1 such as fingerprints, retina patterns, facial structure, etc. Once the appropriate biometric user information is captured and recorded by the corresponding notary PC device 1, the signing user information, the signing user ID information, the digital user signature, and the biometric user information are compiled into a new journal event log using the corresponding notary PC device 1 (Step G). The compiled data is recorded as a new journal event that corresponds to the notary act performed by the notary public in the presence of the signing users and other relevant users. Then, the new journal event log is time-stamped using the corresponding notary PC device 1 to create a permanent record of the notary act (Step H). Finally, the new journal event is appended into the digital journal using the corresponding notary PC device 1 (Step I), where the new journal event can be accessed later for different purposes, such bookkeeping or auditing purposes.

Due to the offline nature of the corresponding notary PC device 1, the present invention safely stores all data corresponding to the different notary acts performed by and under exclusive control of the notary public. The corresponding notary PC device 1 is programmed to abide by all local government laws and regulations. For example, all required data must be entered before Step G, otherwise the new journal event is not generated during Step G. In addition, the present invention facilitates the browsing of previous journal event logs for bookkeeping purposes as well as to generate copies of previous journal events. The corresponding notary PC device 1 can include a search feature that enables the notary public to quickly search previous notary acts. Further, journal event log can be saved and outputted in a searchable format that prevents the editing of the journal event log. For example, if law enforcement or other requests for copies of journal event logs are made, the requests can be easily searched and extracted onto a removable storage device 5 as the corresponding notary PC device 1 is not connected to an external computing device or remote server. In other embodiments, the system of the present invention can include other features that facilitate the bookkeeping of the digital journal stored in the corresponding notary PC device 1.

Figure 7:
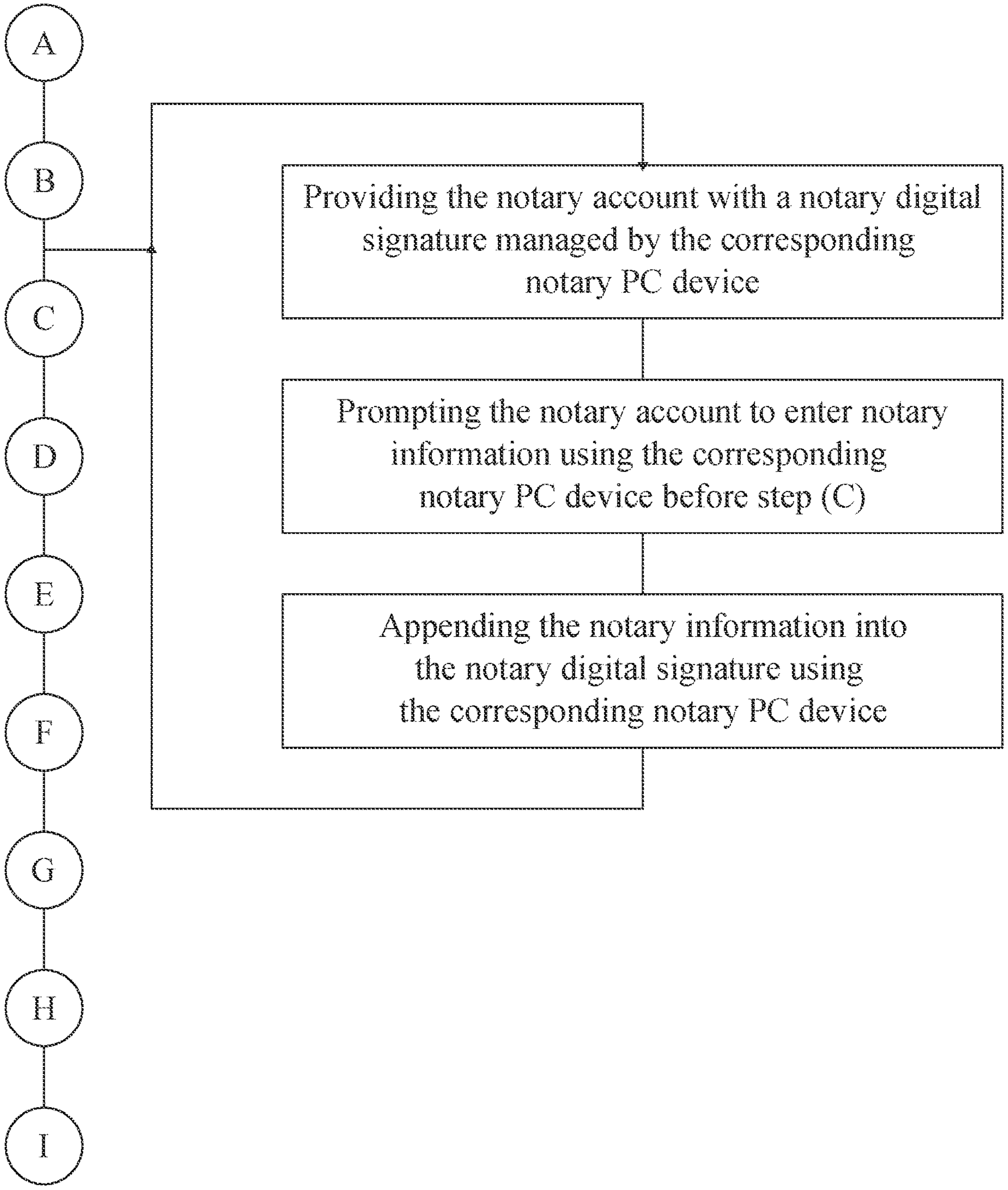
FIG. 7 is a flowchart illustrating the subprocess of creating a notary digital signature.

To improve the security of the system of the present invention, the corresponding notary PC device 1 is preferably designed for exclusive control by the notary public. As can be seen in FIGS. 1 through 4, the system of the present invention may further provide the notary account with a notary digital signature managed by the corresponding notary PC device 1. The notary digital signature is internally stored in the corresponding notary PC device 1 to validate the user of the corresponding notary PC device 1 by the notary public and not unauthorized users. The notary digital signature further validates that the notary public performed the notary acts using the corresponding notary PC device 1 for bookkeeping purposes. As can be seen in FIG. 7, the subprocess of creating a notary digital signature includes the steps of prompting the notary account to enter notary information using the corresponding notary PC device 1 before Step C. the notary information can include, but is not limited to, name, address, and contact information of the notary public, state commissioned in, county/parish bond is filed, commission number, commission expiration date, official signature, etc. Once the notary information is entered, the notary information is appended into the notary digital signature using the corresponding notary PC device 1 to create a notary digital signature that validates the use of the corresponding notary PC device 1 by the notary public.

Figure 8:
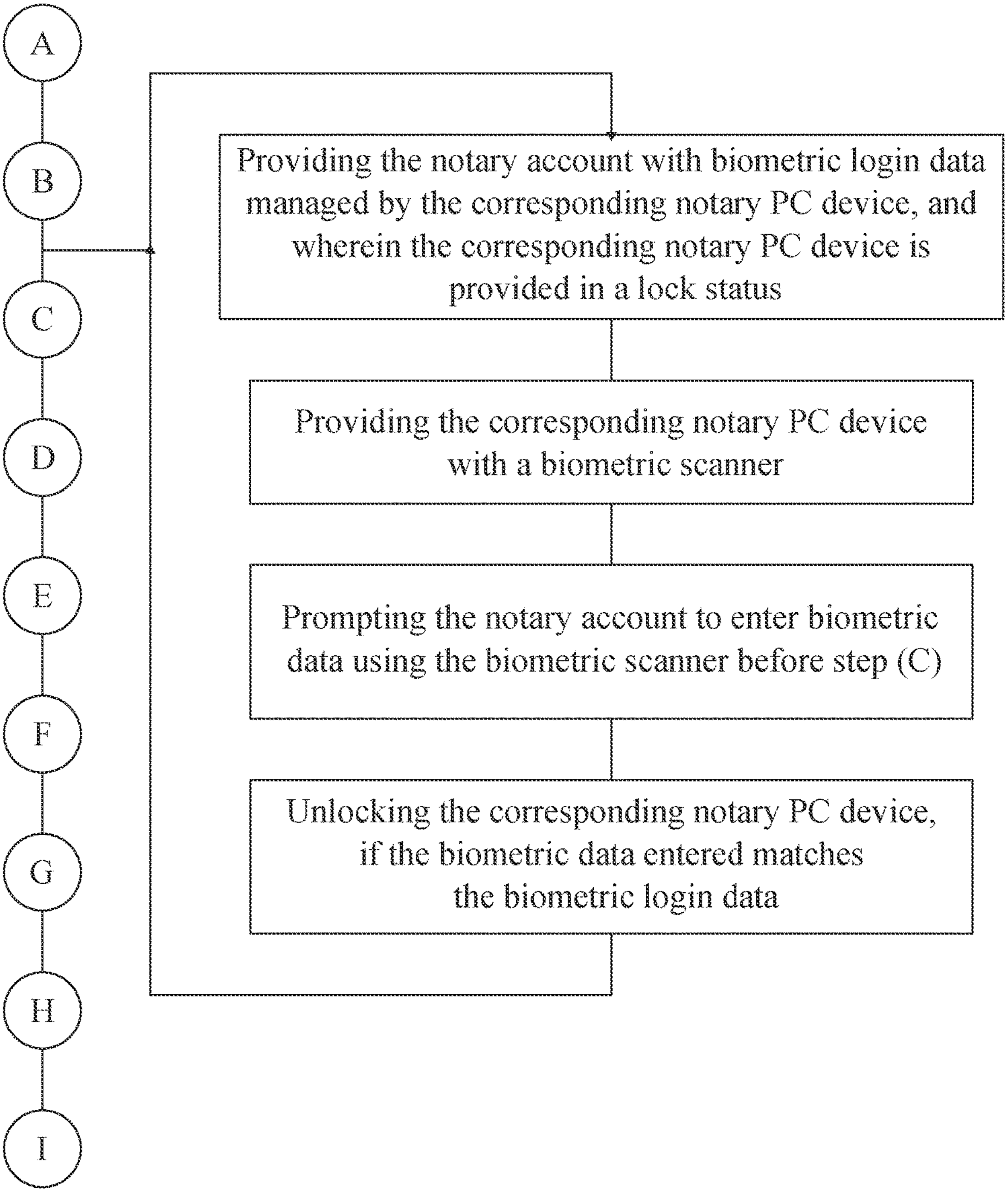
FIG. 8 is a flowchart illustrating the subprocess of accessing the notary PC device using biometric data.

To further control the access to the corresponding notary PC device 1, the present invention may utilize biometric data of the notary public to only allow the notary public to utilize the corresponding notary PC device 1. As can be seen in FIGS. 1 through 4, the notary account is further provided with biometric login data managed by the corresponding notary PC device 1. The biometric login data corresponds to the notary public's biometric data that is used to validate the identity of the user trying to access the corresponding notary PC device 1. The corresponding notary PC device 1 is also provided in a lock status to prevent unauthorized access to the corresponding notary PC device 1. Furthermore, the corresponding notary PC device 1 may further include a biometric scanner 2. The biometric scanner 2 is preferably a device designed to capture various biometric data. The biometric scanner 2 can include, but is not limited to, a fingerprint scanner, a multimedia recording device capable of capturing retinal patterns or facial features, etc. The biometric scanner 2 can be integrated into the corresponding notary PC device 1 or provided as a removable accessory that can be connected to the corresponding notary PC device 1 when desired. As can be seen in FIG. 8, the subprocess of accessing the corresponding notary PC device 1 using biometric data includes the steps of prompting the notary account to enter biometric data using the biometric scanner 2 before Step C. In other words, the notary public may position the biometric scanner 2 against the target physical feature (e.g., eye, face, fingerprint) to scan the capture the biometric data. The biometric data is then processed by the corresponding notary PC device 1 to compare the biometric data entered with the biometric login data. Then, the corresponding notary PC device 1 is unlocked if the biometric data entered matches the biometric login data. The notary public may be prompted to reenter the biometric data if the biometric data entered does not match the biometric login data. The corresponding notary PC device 1 may be configured to be locked after a predetermined number of failed attempts. In other embodiments, the corresponding notary PC device 1 may be accessed using other login methods including, but not limited to, using alphanumeric passwords or personal identification numbers.

Figure 9:
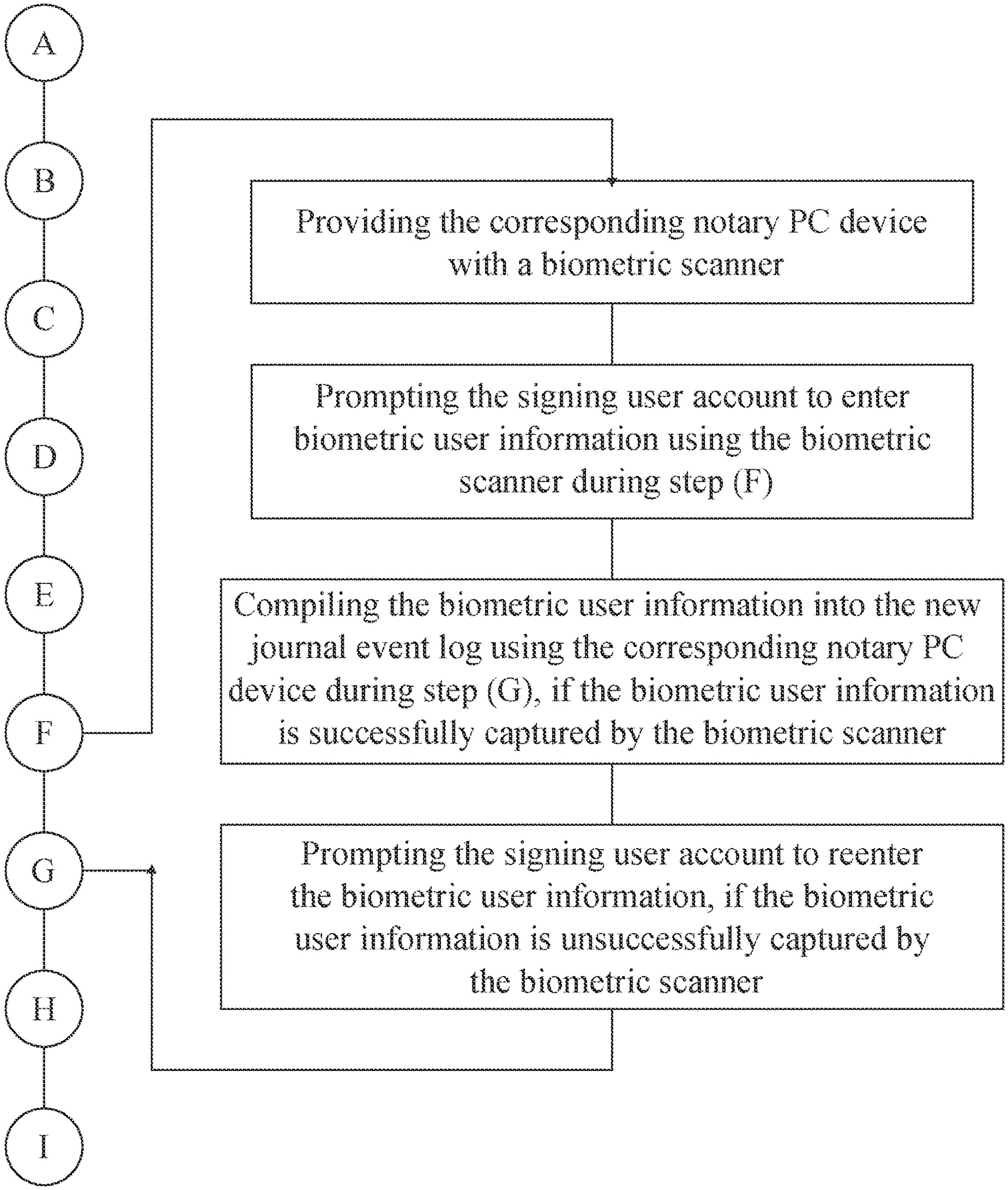
FIG. 9 is a flowchart illustrating the subprocess of entering biometric user information with the biometric scanner.

In addition to facilitating a secure way to access the corresponding notary PC device 1, the biometric scanner 2 can be used to enter the biometric user information while completing the notary act. As can be seen in FIG. 9, the subprocess of entering biometric user information with the biometric scanner 2 includes the steps of prompting the signing user account to enter biometric user information using the biometric scanner 2 during Step F. The notary public may provide the signing user access to the biometric scanner 2 so that biometric user information can be captured using the biometric scanner 2. Then, the biometric user information is compiled into the new journal event log using the corresponding notary PC device 1 during Step G, if the biometric user information is successfully captured by the biometric scanner 2. However, if the biometric user information is unsuccessfully captured by the biometric scanner 2, the signing user account is prompted to reenter the biometric user information. The biometric user information captured by the biometric scanner 2 is processed by the corresponding notary PC device 1 and stored along the rest of the data for the notary act in a suitable format. For example, the captured fingerprint can be stored as a picture for future bookkeeping purposes. In other embodiments, different biometric technologies can be utilized to validate the identity of the user signing the notarized documents.

Figure 10:
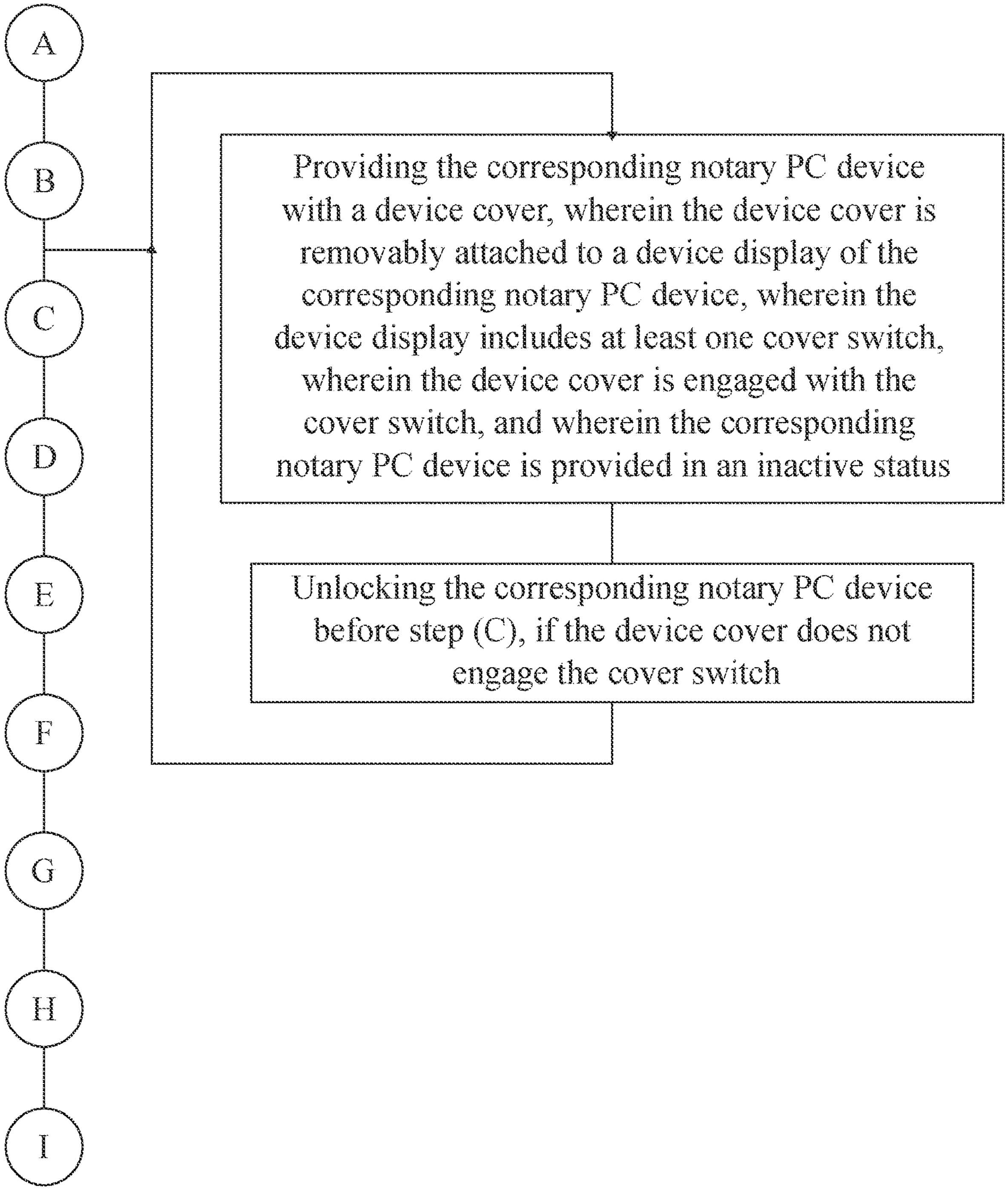
FIG. 10 is a flowchart illustrating the subprocess of activating the notary PC device using the device cover.

As can be seen in FIGS. 1 through 4, the corresponding notary PC device 1 can be equipped with accessories that protect the display 8 of the corresponding notary PC device 1 and other sensitive features. In one embodiment, the corresponding notary PC device 1 may further include a device cover 3. The device cover 3 can be a removable structure that covers the display 8 of the corresponding notary PC device 1 to protect the display 8 and other sensitive features. The device cover 3 is removably attached to the device display 8 of the corresponding notary PC device 1. In addition, the device display 8 includes at least one cover switch 4 that can be engaged with the cover switch 4. The cover switch 4 can include, but is not limited to, sensors or mechanical devices that detect the positioning of the device cover 3 against the device display 8 to deactivate the corresponding notary PC device 1. In other words, the corresponding notary PC device 1 is in an inactive status when the device cover 3 is attached to the corresponding notary PC device 1. As can be seen in FIG. 10, the subprocess of activating the corresponding notary PC device 1 using the device cover 3 involves the step of activating the corresponding notary PC device 1 before Step C, if the device cover 3 does not engage the cover switch 4. In other words, when the notary public removes the device cover 3 from the device display 8, the corresponding notary PC device 1 is activated so that the notary public can proceed to unlock the corresponding notary PC device 1 using biometric data. In other embodiments, different devices or mechanisms can be used to protect the sensitive features of the corresponding notary PC device 1.

Figure 11:
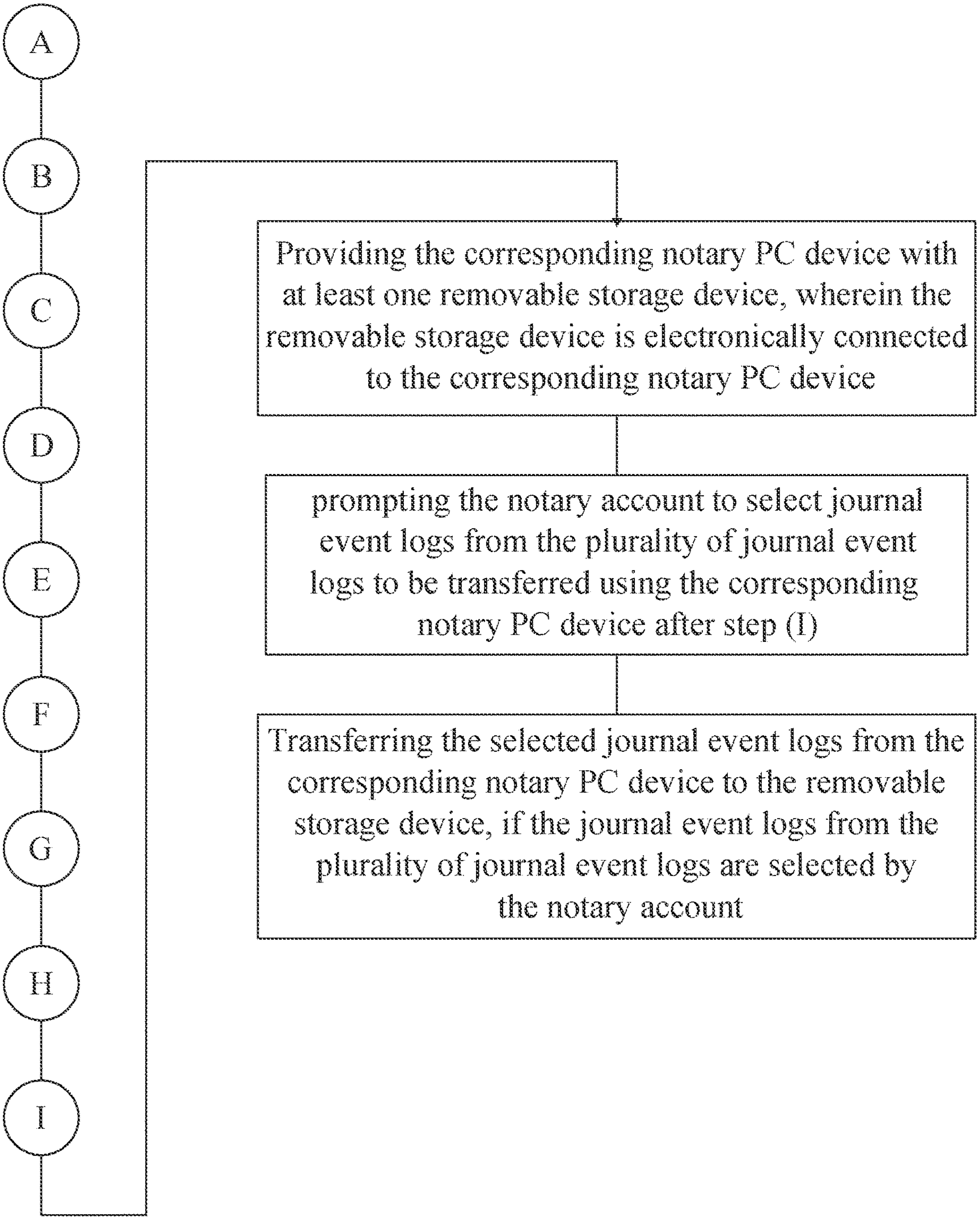
FIG. 11 is a flowchart illustrating the subprocess of transferring stored journal data to the removable storage device from the notary PC device.

As previously discussed, the corresponding notary PC device 1 is preferably disconnected from external systems or devices to protect the stored data and meet the local government laws and regulations. However, to enable the transfer of data from the corresponding notary PC device 1 to an external device or system, the corresponding notary PC device 1 may further include at least one removable storage device 5. As can be seen in FIGS. 1 through 4, the removable storage device 5 is a portable device that is compatible with the corresponding notary PC device 1 as well as the target devices where the data is going to be transferred to. For example, the removable storage device 5 can be a Universal Serial Bus (USB) storage device that can be plugged into a suitable port on the corresponding notary PC device 1. This way, the removable storage device 5 can be electronically connected to the corresponding notary PC device 1. As can be seen in FIG. 11, the subprocess of transferring stored journal data to the removable storage device 5 from the corresponding notary PC device 1 includes the steps of prompting the notary account to select journal event logs from the plurality of journal event logs to be transferred using the corresponding notary PC device 1 after Step I. The corresponding notary PC device 1 can provide various administrative functions that enable the notary public to select individual journal event logs or groups of journal event logs to be transferred. The corresponding notary PC device 1 can also provide administrative functions that enable the notary public to group journal event logs using different filters. Once the notary public has selected the journal event logs to be transferred, the selected journal event logs are transferred from the corresponding notary PC device 1 to the removable storage device 5. Then, the notary public may unplug the removable storage device 5 from the corresponding notary PC device 1. The notary public may send the removable storage device 5 to the appropriate agency for safe storage or plug the removable storage device 5 into a different computing device that is connected to the appropriate remote server for storage.

Figure 12:
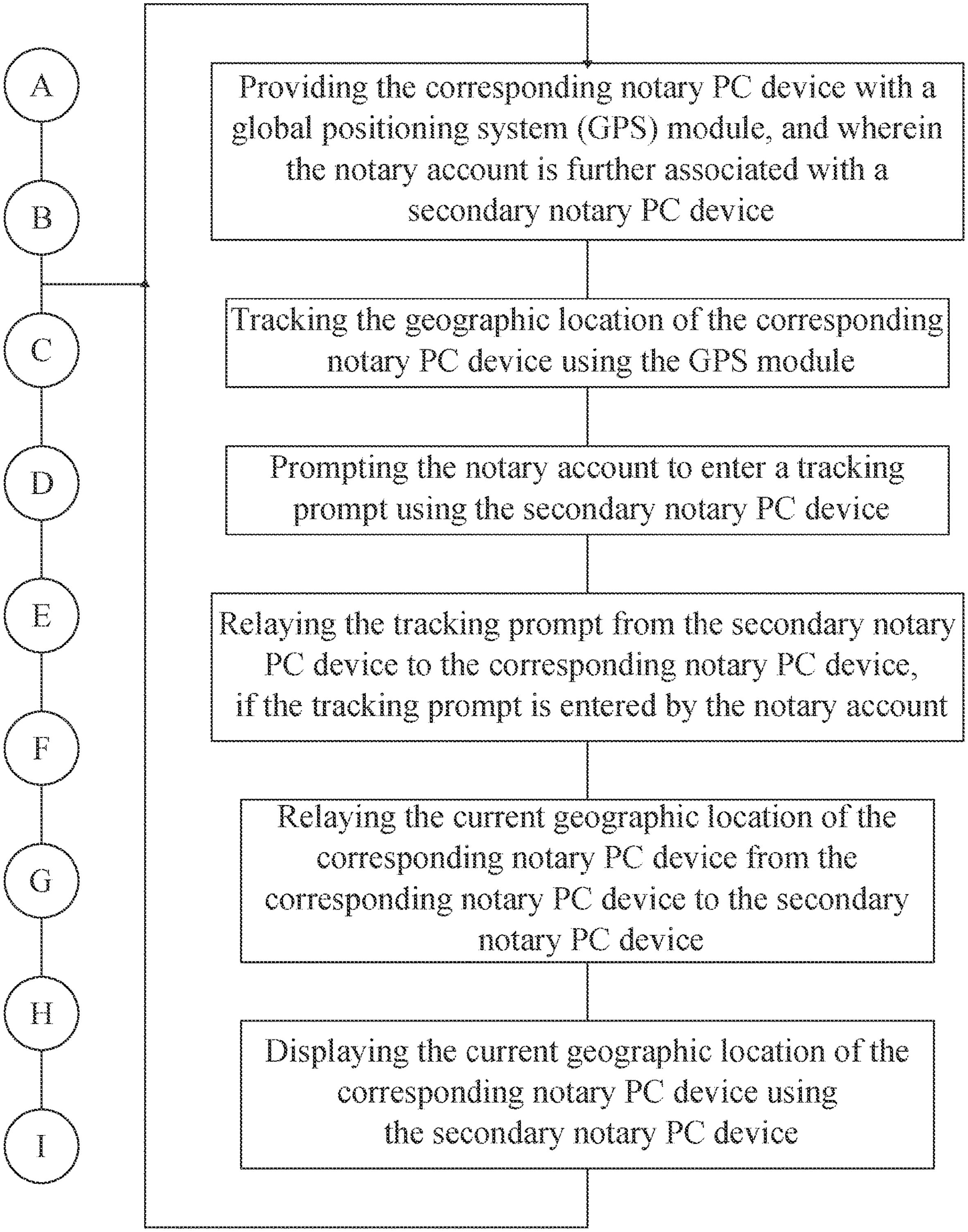
FIG. 12 is a flowchart illustrating the subprocess of tracking the notary PC device using the GPS module.

As can be seen in FIGS. 1 through 4, in some embodiments, the corresponding notary PC device 1 can be provided with a global positioning system (GPS) module 6. The GPS module 6 helps track the location of the corresponding notary PC device 1 in case the corresponding notary PC device 1 is lost or stolen to protect the confidential data stored within. To help track the corresponding notary PC device 1, the notary account can be further associated with a secondary notary PC device 7, such as the notary public's smartphone or personal computer. As can be seen in FIG. 12, the subprocess of tracking the corresponding notary PC device 1 using the GPS module 6 includes the steps of tracking the geographic location of the corresponding notary PC device 1 using the GPS module 6. The location tracking can be performed continuously, periodically, or selectively activated when the tracking of the corresponding notary PC device 1 is performed. Then, the notary account is prompted to enter a tracking prompt using the secondary notary PC device 7. In other words, the notary public initiates the tracking of the corresponding notary PC device 1 from the secondary notary PC device 7. Then, the tracking prompt is relayed from the secondary notary PC device 7 to the corresponding notary PC device 1, if the tracking prompt is entered by the notary account. This way, only tracking data is wirelessly transmitted to/from the corresponding notary PC device 1 to prevent unauthorized hacking into the corresponding notary PC device 1. Then, the current geographic location of the corresponding notary PC device 1 is relayed from the corresponding notary PC device 1 to the secondary notary PC device 7. Finally, the current geographic location of the corresponding notary PC device 1 is displayed using the secondary notary PC device 7 for the notary public. This way, the notary public can track and locate the missing corresponding notary PC device 1 to protect the confidential data stored within.

Figure 13:
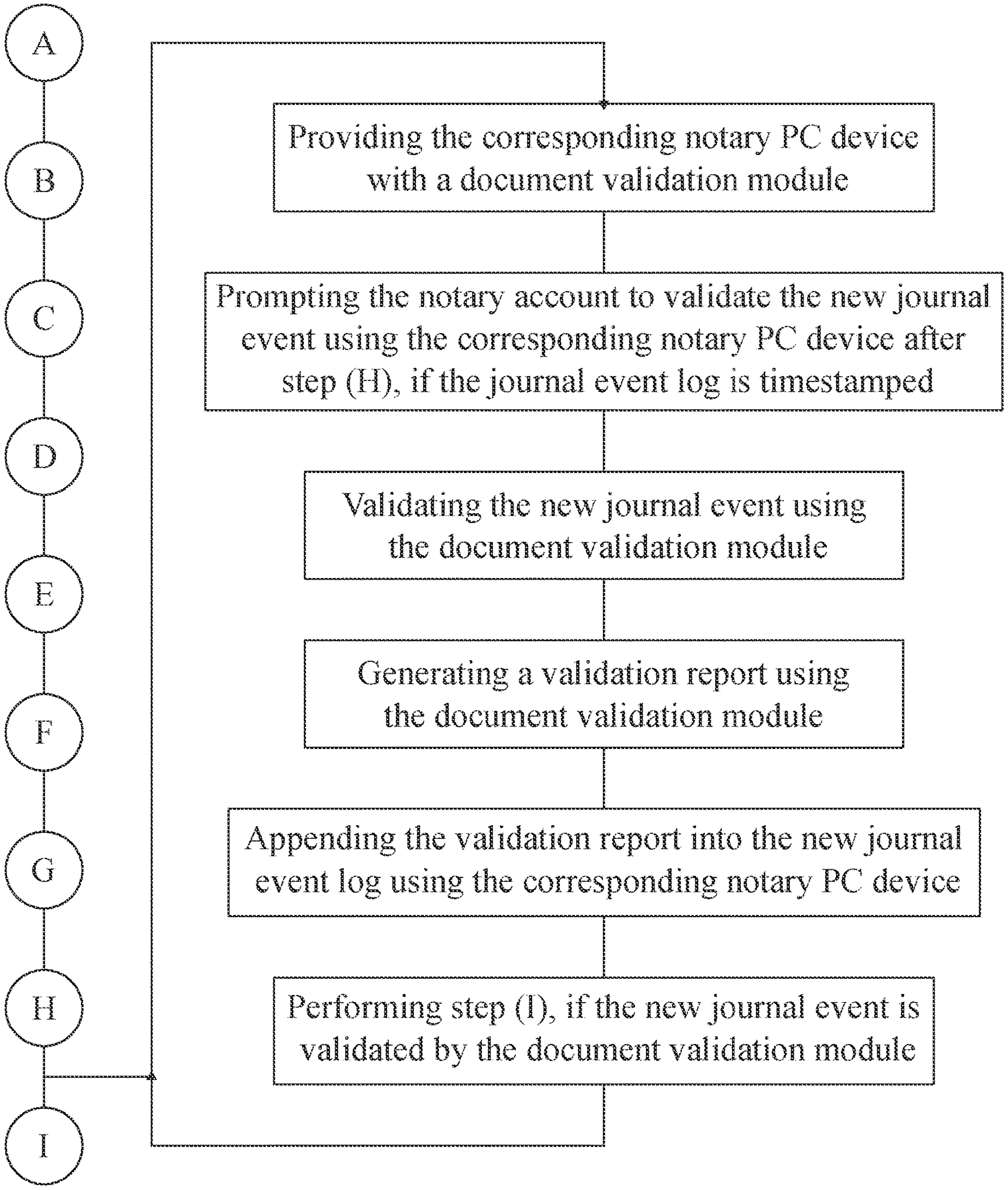
FIG. 13 is a flowchart illustrating the subprocess of validating the authenticity of the journal event log.

As can be seen in FIGS. 1 through 4, in some embodiments, the corresponding notary PC device 1 may further include a document validation module that validates the documentation, signatures, and other data corresponding to the notary act. For example, the document validation module can compare the signatures collected to the signatures on the documents to ensure that the signatures match. The document validation module can also verify digital signatures, time stamps, the authenticity of the signatures, as well as to detect any tampering of the documents. As can be seen in FIG. 13, the subprocess of validating the authenticity of the journal event log includes the steps of prompting the notary account to validate the new journal event using the corresponding notary PC device 1 after Step H, if the journal event log is timestamped. In other words, the document validation module is engaged once the new journal event log is timestamped. Then, the new journal event is validated using the document validation module. Once the validation process is performed, a validation report is generated using the document validation module. The validation report can include the results of the validation process, even if the results show inconsistencies in the journal event log. Then, the validation report is appended into the new journal event log using the corresponding notary PC device 1 for bookkeeping purposes. This way, authorities can view all the results of the verification process during audits. Finally, Step I is performed, if the new journal event is validated by the document validation module. This way, the authenticity and validity of the notary act is maintained only if everything is in order. In other embodiments, different authentication methods can be utilized to meet laws and regulations set by the local government.

Although the invention has been explained in relation to its preferred embodiment, it is to be understood that many other possible modifications and variations can be made without departing from the spirit and scope of the invention.

What is claimed is:

1. A method of the offline digital notarization of documents, the method comprising the steps of:

(A) providing at least one notary account, wherein the notary account is associated with a corresponding notary personal computing (PC) device, wherein the corresponding notary PC device includes a digital journal, and wherein the digital journal includes a plurality of journal event logs;

(B) providing at least one signing user account managed by the corresponding notary PC device, wherein the signing user account is associated with a digital user signature;

(C) prompting the notary account to input background information using the corresponding notary PC device;

(D) prompting the notary account to input signing user identification (ID) information using the corresponding notary PC device;

(E) prompting the signing user account to enter the digital user signature using the corresponding notary PC device;

(F) prompting the signing user account to enter biometric user information using the corresponding notary PC device;

(G) compiling the signing user information, the signing user ID information, the digital user signature, and the biometric user information into a new journal event log using the corresponding notary PC device;

(H) timestamping the new journal event log using the corresponding notary PC device;

(I) appending the new journal event into the digital journal using the corresponding notary PC device;

providing the corresponding notary PC device with a global positioning system (GPS) module, and wherein the notary account is further associated with a secondary notary PC device;

tracking the geographic location of the corresponding notary PC device using the GPS module;

prompting the notary account to enter a tracking prompt using the secondary notary PC device;

relaying the tracking prompt from the secondary notary PC device to the corresponding notary PC device, if the tracking prompt is entered by the notary account;

relaying the current geographic location of the corresponding notary PC device from the corresponding notary PC device to the secondary notary PC device; and displaying the current geographic location of the corresponding notary PC device using the secondary notary PC device;

providing the corresponding notary PC device with a document validation module;

prompting the notary account to validate the new journal event using the corresponding notary PC device after step (H), if the journal event log is timestamped;

validating the new journal event using the document validation module;

generating a validation report using the document validation module;

appending the validation report into the new journal event log using the corresponding notary PC device; and performing step (I), if the new journal event is validated by the document validation module.

2. The method as claimed in claim 1 further comprising the steps of:

providing the notary account with a notary digital signature managed by the corresponding notary PC device;

prompting the notary account to enter notary information using the corresponding notary PC device before step (C); and appending the notary information into the notary digital signature using the corresponding notary PC device.

3. The method as claimed in claim 1 further comprising the steps of:

providing the notary account with biometric login data managed by the corresponding notary PC device, and wherein the corresponding notary PC device is provided in a lock status;

providing the corresponding notary PC device with a biometric scanner;

prompting the notary account to enter biometric data using the biometric scanner before step (C); and unlocking the corresponding notary PC device, if the biometric data entered matches the biometric login data.

4. The method as claimed in claim 1 further comprising the steps of:

providing the corresponding notary PC device with a biometric scanner;

prompting the signing user account to enter biometric user information using the biometric scanner during step (F);

compiling the biometric user information into the new journal event log using the corresponding notary PC device during step (G), if the biometric user information is successfully captured by the biometric scanner; and prompting the signing user account to reenter the biometric user information, if the biometric user information is unsuccessfully captured by the biometric scanner.

5. The method as claimed in claim 1 further comprising the steps of:

providing the corresponding notary PC device with a device cover, wherein the device cover is removably attached to a device display of the corresponding notary PC device, wherein the device display includes at least one cover switch, wherein the device cover is engaged with the cover switch, and wherein the corresponding notary PC device is provided in an inactive status; and unlocking the corresponding notary PC device before step (C), if the device cover does not engage the cover switch.

6. The method as claimed in claim 1 further comprising the steps of:

providing the corresponding notary PC device with at least one removable storage device, wherein the removable storage device is electronically connected to the corresponding notary PC device;

prompting the notary account to select journal event logs from the plurality of journal event logs to be transferred using the corresponding notary PC device after step (I); and transferring the selected journal event logs from the corresponding notary PC device to the removable storage device, if the journal event logs from the plurality of journal event logs are selected by the notary account.

* * * * *